United States Patent [19]

Curci

[11] Patent Number: 4,667,909

[45] Date of Patent: May 26, 1987

[54] SINGLE-STICK CONTROL SYSTEM FOR HELICOPTERS

[76] Inventor: Alfred Curci, 183 London Dr., Hamden, Conn. 06517

[21] Appl. No.: 785,988

[22] Filed: Oct. 10, 1985

[51] Int. Cl.[4] ............................................. B64C 13/00
[52] U.S. Cl. ................................... 244/234; 244/237; 74/471 XY
[58] Field of Search ................... 244/234, 237, 229; 74/471 XY, 523

[56] References Cited

U.S. PATENT DOCUMENTS

| | | | |
|---|---|---|---|
| 2,398,601 | 4/1946 | Seifert | 244/234 |
| 2,418,369 | 4/1947 | Schubert | 244/237 |
| 3,011,739 | 12/1961 | Boyce et al. | 244/237 |
| 3,350,956 | 11/1967 | Monge | 74/471 XY |
| 3,409,252 | 11/1968 | Miller | 244/237 |

Primary Examiner—Joseph F. Peters, Jr.
Assistant Examiner—Lynn M. Fiorito

[57] ABSTRACT

A single-stick control system for helicopters, by which at least four different flight control functions of piloting the craft—cyclic, collective with simultaneous engine throttling, independent throttling for one or more engines and including immediate transition to emergency autorotation—may be performed by the manipulation of the single stick by one and the same hand of the pilot.

4 Claims, 2 Drawing Figures

Fig_1

SINGLE-STICK CONTROL SYSTEM FOR HELICOPTERS

This invention relates to helicopters in general, and in particular to a pilot operable single stick controlling system therefor, by which directional flight, vertical flight with automatic power throttling, independent throttling, and instantaneous conversion to autorotation, in case of a sudden power failure in flight, may be effected by manipulation of the single stick, by one and the same hand of the pilot.

Consistent with "accepted convention", most operational helicopters of current size are provided with two entirely separate pilot control sticks. These are embodied, usually, in a cyclic stick and a cottective stick combined with engine controls. Customarily, the former is mounted in front of the pilot's seat while the latter generally is mounted at the left side of the seat. The pilot (or pilots when the sticks are duplicated for dual control) must use two hands for controlling the craft. This requirement makes piloting the helicopter a difficult and fatiguing task, and further it exacerbates the inherent danger zone of all helicopters which, in case of a sudden power failure in flight, requires immediate conversion to autorotation.

As is well-known, when a sudden power failure occurs in flight, pilot reaction must be almost instantaneous to lower the collective pitch of the rotor blades to ensure autorotation for a safe emergency landing of the helicopter. Depending upon rotational inertia of the rotor system, in a power-off emergency, the pilot must react immediately within a maximum of three seconds to lower the total blade pitch for autorotation. However, in such a sudden emergency, forced to reach out for the presently used separate pitch stick, even the alert, highly skilled pilot may experience difficulty and be unable to accomplish the required manipulation of the separate pitch stick in the allowed three seconds, thus endangering the craft and its occupants.

The present invention overcomes the aforesaid disadvantages of the presently used two stick control system. The single stick arrangement of the present invention provides a control system which is functionally effective, reliable, comparatively simple in construction and it has practical application in all operational helicopters of current size. Moreover, it provides greater ease of piloting and greatly improves the safety factor of all helicopters by ensuring a positive, safe and quick transition to autorotational state in the event of a sudden power failure in flight.

It is therefore a primary object of the present invention to arrange all main rotor controls, including emergency transition to autorotation, for their operation by the manipulation of a single control stick, by one and the same hand of the pilot, during its uninterrupted grasp.

Another object of this invention is to provide a single stick control system, which is operable as aforesaid, for controlling cyclic blade pitch, and for controlling collective pitch simultaneously with throttling for one or more power plants and including selective independent throttling for the latter.

Another significant feature of this invention is that, apart from its large contribution to ease of piloting the helicopter, it also enhances the safety of the craft by permitting, with unmistakability of purpose, immediate transition to autorotational condition in the event of a sudden power failure in flight, thus securing a substantially safe power-off landing of the helicopter.

Another feature of this invention is to provide a single stick control system which is readily adaptable for dual control purposes in helicopters of various configurations.

Still another feature of the present invention is that, arranged for dual control, the duplicated sticks may be employed either in tandem or side-by-side relationship with substantially no modification of the basic construction thereof.

Other objects and advantages of the present invention will be apparent from the specification and claims and from the accompanying drawings, in which:

Figure 1:
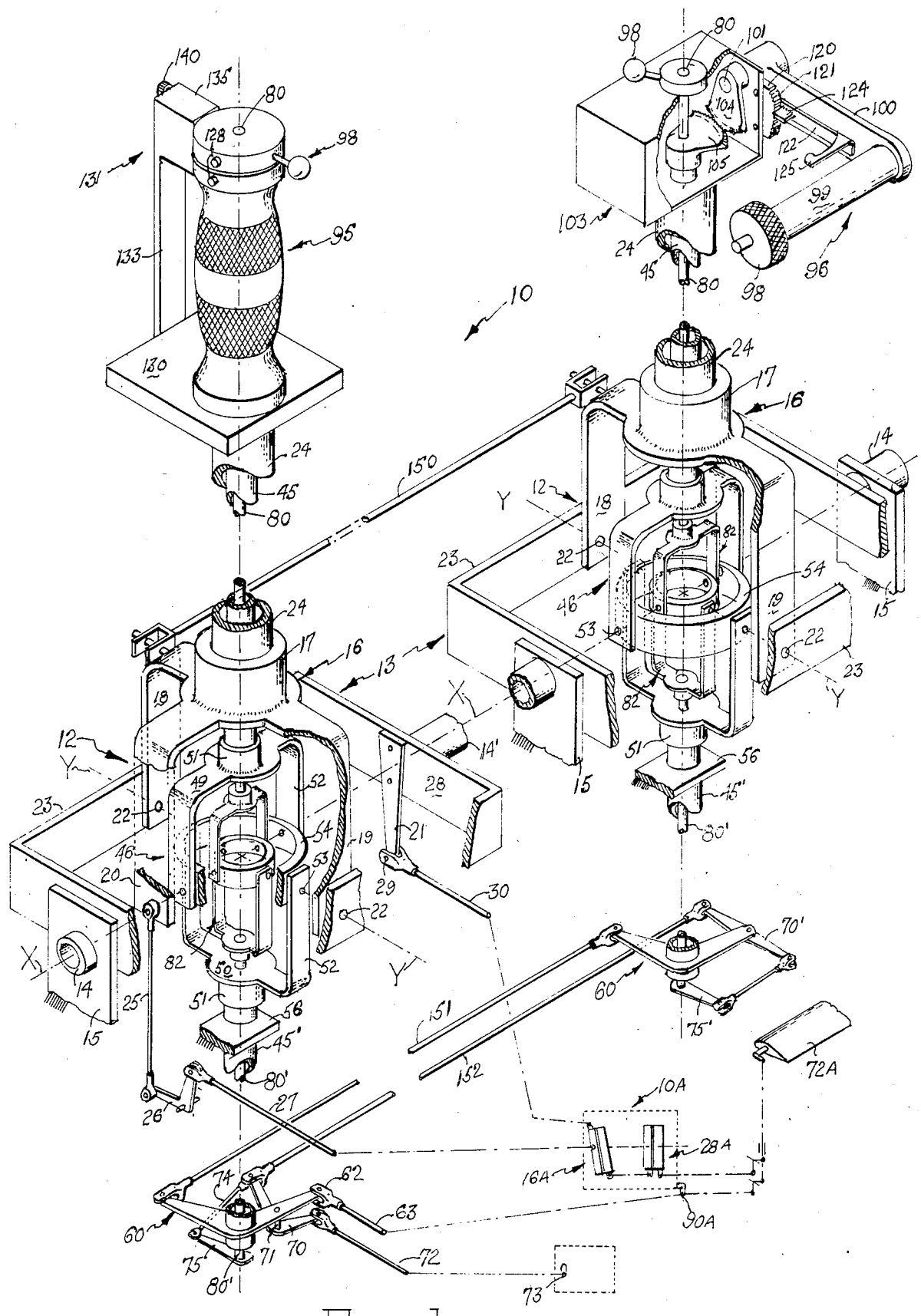
FIG. 1 is a perspective illustration of the invention, with certain parts broken away, showing the single stick mechanism arranged in duplicate for dual control purposes.

In FIG. 1 the single stick control mechanism for helicopters, generally designated 10, is shown constructed in accordance with the present invention. The manual control is placed conveniently, as usual, within reach of the pilot (or pilots) and it is suitably supported on the helicopter structure, which is not shown except as anchoring points.

As illustrated, the control sticks are duplicated and interlinked for dual control purposes. These sticks may be employed either in side-by-side or tandem relationship with no substantial change of the basic mechanism, as will be described later. However, since the duplicated sticks are essentially equivalent to each other in their main features, generally, only one is described.

Referring to FIG. 1, the present control system comprises a first universal joint generally designated 12 consisting of companion members of which one preferably is a rectangular frame 13 having integral diametrically opposite trunnions 14 pivotally supported in a plurality of aligned bearing brackets 15, which latter are suitably mounted firmly on the helicopter structure (not shown), with the frame 13 being rockable or turnable about the axis X of the trunnions 14.

The other member of the universal joint 12 is a yoke 16 having a bored out central hub 17 from which depends three parallel arms 18, 19 and 20. Arms 18 and 19 are spaced apart and diametrically opposite each other, with the respective free ends thereof being pivotally mounted in apertures 22 formed in the opposed rails 23 of frame 13, with the yoke 16 thus being rockable or turnable about the Y axis. The yoke arm 20, just previously mentioned, is circumferentially spaced 90 degrees from arms 18 and 19, and it serves as a cyclic control member, as will be explained presently.

It will be noted that the X and Y axes intersect each other with the center of the universal joint 12 being at the intersection and having universal motion thereabout.

A tubular stick 24 is secured, such as by welding or any convenient means, with its lower end in the hub 17 of the universal joint 12 for universal motion therewith. Also two cyclic output members consisting of the previously mentioned yoke arm 20 and the radial arm 21 are carried respectively by the companion members 16 and 13 of the universal joint 12 for pivotal motion therewith.

As noted, the free end of the arm 20 is pivoted to one end of a ball joint rod 25 with the other end of the latter being similarly pivoted to one arm of bellcrank 26 while the other arm of this bellcrank 26 is pivoted to one end of a cyclic control tube 27, which latter receives axial motion on rocking or turning motion of the universal joint yoke 16 about the Y axis.

The above referred to cyclic output arm 21 is carried by and radiates from a side rail 28 of frame 13 for pivotal motion therewith about the X axis. The free end of arm 21 is pivoted at 29 to one end of a second cyclic control tube 30, which latter also receives axial motion on rocking motion of the frame 13 about the X axis.

Each free end of the aforesaid cyclic control tubes 27 and 30 may be connected as usual to any well-known pitch actuating or swashplate device for transmitting cyclic pitch control to the rotor blades in conventional manner.

It is preferred, however, to adapt the present invention to the pitch actuating mechanism shown and described in my U.S. Pat. No. 4,525,123. As is illustrated in diagram form at 10A in FIG. 1, each free end of the above mentionned control tubes 27 and 30 may be connected to the swashplate unit 16A, as shown, for tilting the latter into any one of its universal positions for transmitting cyclic pitch variations to the rotor blades 72A (one shown) substantially as described in the aforesaid Patent.

For collective pitch control, the mechanism includes a tubular shaft 45 mounted in the stick 24 for universal motion therewith. This shaft 45 is suitably fixed in the stick 24 against axial displacement but with the capacity for independent rotation therein. The lower end of shaft 45, which rotatably passes through and extends a short distance below the yoke hub 17, carries thereon a second universal joint 46 for rotation therewith.

The universal joint 46 consists of similar upper and lower companion yoke members 49 and 50. Each of the latter has a bored-out central hub 51 having diametrically opposite arms 52. The respective free ends of the latter are pivoted by pairs of pins or trunnions 53 in corresponding pairs of diametrically opposite apertures formed at right angles to each other in the center bearing ring member 54, with the companion yoke members 49 and 50 thus being turnable about axes normal to and intersecting each other, with the center of the universal 46 being at said intersection and coincident with the center of the first universal joint 12.

As already mentioned, the universal joint 46 is carried by the collective control shaft 45, with the lower end of the latter being fixed, such as by welding, in the hub 51 of the upper yoke member 49. In like manner, secured in the hub of the lower yoke member 50 is a short collective tubular shaft 45' which is suitably supported for rotation in bearing bracket 56, which latter is rigidly fixed on the helicopter structure (not shown). The free end of this shaft 45' carries a double arm lever 60 for rotation therewith. One arm of the latter is pivoted at 62 to one end of the collective control rod or tube 63, which latter receives axial motion on turning or rocking motion of the lever 60. The other end of the control tube 63 may be connected, as usual, to any well-known swashplate device for transmitting in conventional manner collective pitch control to the rotor blades.

It is preferred, however, that the free end of said collective control tube 63 be suitably connected to the pitch actuating unit shown and described in the previously mentioned U.S. Pat. No. 4,525,123. Thus, with reference to FIG. 1 at 10A, the free end of this control tube 63, for providing collective pitch control, may be connected as shown to the collective lever 90A to operate substantially in a manner described in detail in the aforesaid Patent for transmitting collective pitch change to the rotor.

As noted in FIG. 1, the other arm of the previously mentioned double arm collective lever 60 provides an interconnecting element for transmitting collective motion between the two sticks 24 for dual control purposes, which will be described later.

In common with most operational helicopters, the present single stick control system includes mechanism for throttle control of one or more engines, both simultaneously with variations of collective pitch and also selectively and independently thereof.

The mechanism for simultaneous throttle and collective pitch control comprises a bellcrank 70 rotatably carried on pivot 71 which is suitably fixed on the before described collective double arm lever 60, with the axis of pivot 71 being radially spaced from and parallel to the axis of the collective control shaft 45. One arm of bellcrank 70 is operatively connected through link 72 with the throttle lever shown diagrammatically at 73 in FIG. 1. The other arm of bellcrank 70 is pivotally connected by a short rod or link 74 to the free end of lever arm 75. This link connection 74 between bellcrank 70 and lever 75 serves a dual purpose. During collective with throttle control motion, it maintains bellcrank 70 stationary with respect to its carrying arm 60, so that on rotation of the latter for collective pitch operation, the bellcrank moves bodily therewith. And for independent throttling, the lever 75 is independently rotated, by means described later, which motion through link 74 causes bellcrank 70 to rotate about its pivot axis 71 and relative to the collective lever arm 60.

It will be evident from the above that for operating collective pitch control with simultaneous throttle control, the collective control shaft 45 is, by means described later, manually rotated independently about its axis together with the universal joint 46, lever arm 60 and bellcrank 70, which motion in turn imparts axial motion to both the throttle link 72 and the collective control tube 63 for simultaneously varying the collective pitch of the rotor blades 72A (one shown) and also the position of the throttle lever 73.

To obtain a proper or desired coupling ratio between this simultaneous collective pitch and throttle control, the related parts of the above described mechanism, as well as the spacing between the pivot axes thereof, will be appropriately dimensioned and arranged to provide a desired proportional relationship therebetween to ensure substantial coordination between power output and rotor requirement.

As mentioned before, the present single stick control system further incorporates mechanism for controlling the engine throttle 73 independently of collective pitch control. This mechanism, as illustrated in FIG. 1, comprises a throttle control tubular torque shaft 80. The latter is suitably mounted in the collective shaft 45 for rotation about its axis but held against axial motion therein. The lower end of shaft 80, which projects below hub 51 of the upper yoke 49 of the second universal joint 46, carries for rotation therewith, a third universal joint 82.

The third universal 82 is like the second universal joint 46 in all respects except that it is properly sized or dimensioned so as to be freely rotatably about its axis within the confines of the second universal joint 46, without interference therebetween. This third universal joint 82 also has a common center of operation with that of the other two universal joints 12 and 46. The lower yoke member of the universal 82 carries a short tubular shaft 80' which rotatably extends through the shaft 45' and its free end has suitably fixed thereto the before referred to lever arm 75 which, through link 74, as already described, is operatively connected to one arm of the bellcrank 70 while the other arm of the latter through link 72 is operatively connected to the throttle lever 73.

From the foregoing it will be evident that for independent throttling, the throttle torque shaft 80 is rotated about its axis jointly with the third universal joint 82 and the lever arm 75, which motion through link 74 causes the bellcrank 70 to rotate about its pivot axis 71 fixed on the collective lever 60, which latter motion causes axial motion of the throttle link 72, thus to vary the position of the engine throttle 73, independently of collective pitch actuation.

Figure 2:
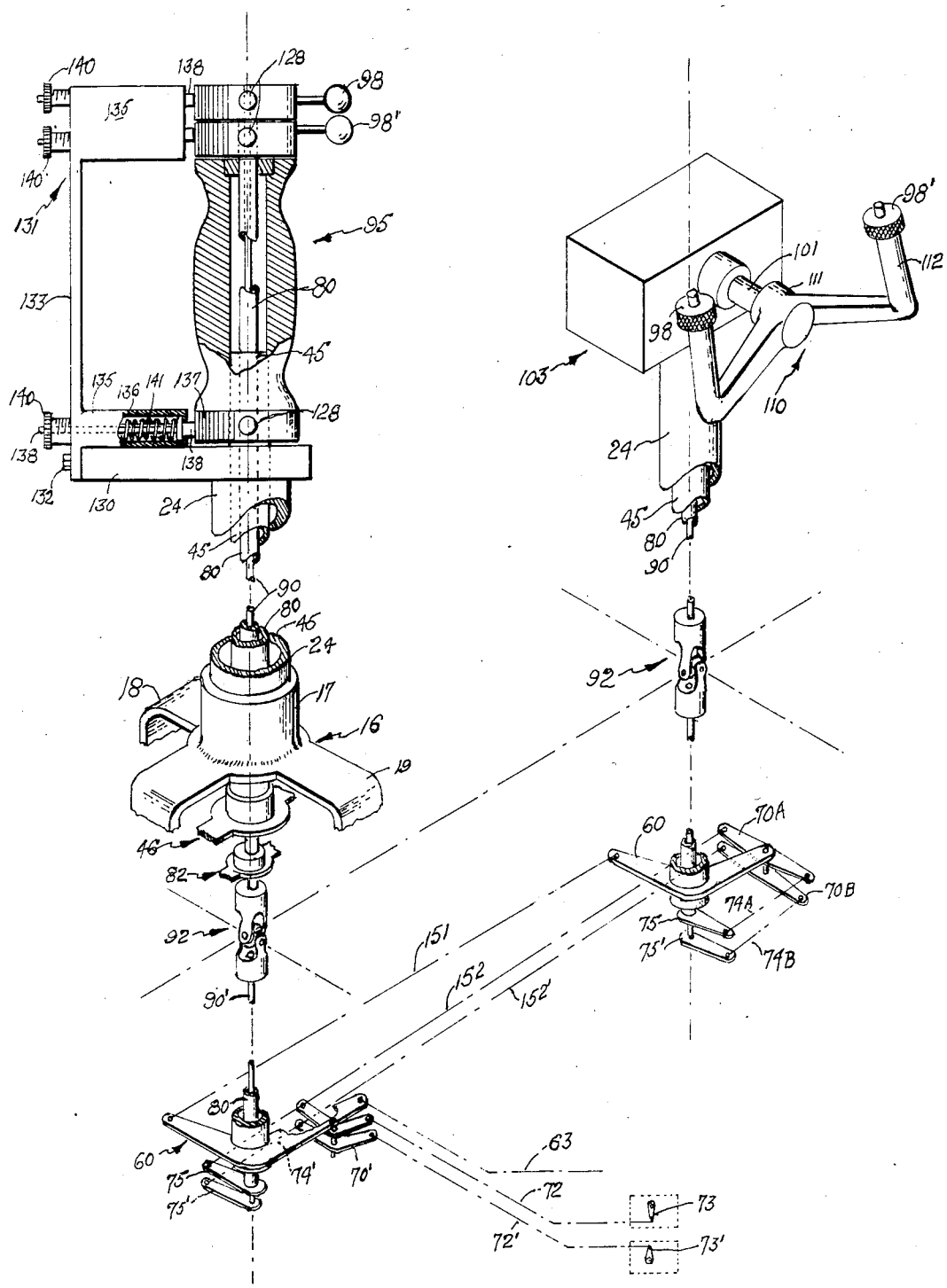
FIG. 2 is a modification corresponding generally to FIG. 1 illustrated partly in perspective and section, with certain parts omitted and others shown fragmentarily, and also showing additional mechanism, including the control elements for actuating a second engine throttle both automatically with collective pitch and independently thereof.

FIG. 2 shows the mechanism for controlling a second engine throttle when more than one power plant is used. This second throttle mechanism, briefly described in the following paragraphs, is the same in hookup and operation as the first throttle control described with reference to FIG. 1.

Referring now to FIG. 2, the second throttle control mechanism comprises a torque shaft 90 which is suitably mounted in shaft 80 being axially fixed but having independent rotation therein about its axis. The lower end of shaft 90 carries for rotation therewith a fourth universal joint 92, which is suitably sized so as to be freely rotatable within the confines of the third universal joint 82, without interference therebetween. Also, the center of this fourth universal joint 92 coincides with the common center of the other previously described three universal joints 12, 46 and 82. The lower end of the universal joint 90 carries a short shaft 90' which rotatably extends through the shaft 80' and has fixed thereon lever arm 75' which latter, like arm 75, is operatively connected through link 74' to one arm of a second bellcrank 70', while the other arm of the latter through link 72' is operatively connected to the second throttle lever 73'.

It should be mentioned here that, if desired, a flexible shaft connection of known construction, which is axially flexible and torsionally rigid, may be substituted for the fourth universal joint 92. However, experience with a full scale model of the present control system constructed substantially as shown in the drawings, shows that a rigidly articulated joint, such as shown at 92 in FIG. 2, functions with greater effectiveness, and for this reason is preferred.

The operation of the second throttle 73', shown in FIG. 2, as already mentioned, is the same for all purposes as the first throttle 73 previously described with reference to FIG. 1. Thus, by following the relative motion of the related elements of each of these two throttles in FIG. 2, it will be apparent that both throttles are controlled simultaneously with collective pitch control movement, and both throttles also may be independently retarded or advanced, either together or singly, without disturbing the collective pitch setting.

The single-stick control system is provided with a grip member or handle which may be conveniently grasped by the pilot for actuating the various operating elements of the control system.

In FIG. 1 two forms of handles are illustrated generally at 95 and 96. Handle 95 is formed generally as a hollow or tubular cylindrical member which is suitably keyed or coupled rigidly to the upper end of the collective torque shaft 45, as more clearly seen in FIG. 2, with the handle thus having universal motion with the stick 24 and also independent rotation relative thereto.

From the foregoing it will be apparent, then, that by grasping the handle 95, the pilot selectively may move it jointly with stick 24, in any desired direction within the range of its universal movement, for imparting cyclic pitch control to the rotor in a manner already described. The handle 95 also may be independently rotated relative to the stick 24 to provide simultaneous collective pitch and throttle control by means and in a manner previously described.

It will be apparent, of course, that these two aforesaid control operations may be, as desired or required, performed simultaneously or successively by the uninterrupted grasp of the handle 95.

For independent throttling, the throttle torque shaft 80 extends through handle 95 and suitably rigidly fixed to its upper end is a twist member or knob 98, which latter may be independently rotated jointly with the torque shaft 80 for retarding or advancing the throttle lever 73 independently of collective pitch, by means described before.

The modified handle shown generally at 96 in FIG. 1 is formed as a crank lever with its grip portion 99 being fixed at right angles to its arm 100. Fixed rigidly to the free end of the latter is a shaft 101 which passes through and is pivotally supported in a bearing aperture formed in a side wall of a boxlike housing 103. The latter, which is shown partly broken away, is rigidly fixed by suitable means to the upper end of the stick 24 and has universal motion therewith. The inner end of shaft 101 has rigidly fixed thereto a segmental bevel gear 104 which meshes with a similar gear 105 suitably fixed to the upper end of the collective torque shaft 45 for transferring motion between the handle 96 and shaft 45 on pivotal motion of the shaft 101 about its axis.

From the foregoing, it will be apparent that the crank lever has universal movability with the stick 24 for providing cyclic pitch control, by means before described. The handle 96 also is independently movable relative to the stick 24 about its pivot axis 101 which motion, through gears 104 and 105 causes rotation of the collective torque shaft 45 for providing total or collective pitch with simultaneous throttle control, in a manner previously described.

For independent throttling, the throttle torque shaft 80 may be extended through the upper wall of housing 103 (not shown) and its upper end may have fixed thereto the twist knob 98 in a manner shown in connection with handle 95.

Alternatively, the throttle twist knob 98 may be rotatably carried on the free end of the grip portion 99 of handle 96, as shown. This knob 98 may be suitably operatively connected by any suitable linkage train (not shown) to the upper end of the throttle torque shaft 80, which latter, in this case, would terminate within the confines of housing 103.

Still another modified handle is shown in FIG. 2 generally at 110. This handle 110 substantially is similar in arrangement and operation to handle 96 of FIG. 1 for all purposes, including cyclic pitch control and collective pitch control with simultaneous throttling.

For independent throttling of two engine installations, the twist knobs 98 and 98' may be mounted, as before mentioned, above the upper wall of housing 103 (not shown) or, as shown in FIG. 2 these throttle control knobs 98 and 98' may be suitably mounted for rotation on the free end of each upright member 112 of the handle 110, with each knob also being suitably operatively connected with the throttle torque shafts 80 and 90, respectively.

The single-stick control mechanism further includes constraint devices, either frictional or the positive locking type, for holding the control organs in a desired position when left unattended by the pilot during flight of the craft. Such constraints are, of course, susceptible of a large variety of different structures, arrangements and positional application.

For example, handle 96 of FIG. 1 may be provided with a positive locking device to hold the latter against rotation about its pivot axis 101. This mechanism comprises a segmental rack 120 fixed, such as by bolts or rivets, to the wall of housing 103, with the rack teeth 121 facing the grip member 99 of handle 96. Slidably supported in suitable keepers (not shown) on the arm 100 of handle 96 is an elongated bolt or dog 122 which is axially shiftable along the arm 100 to bring its forward edge or nose 124 into and out of engagement with the teeth 121 of rack 120. The dog is normally urged into locking engagement with rack 120 by a suitable compression spring (not shown). For actuating the dog 122, it is provided with a trigger 125 arranged in juxtaposition with handle grip 99, so that while grasping the latter with one hand, the pilot easily may reach out with one or more fingers to manipulate the trigger 125 and move the dog 122 toward the handle 99 against the force of its spring to disengage it from its locking position with rack 120, thus freeing the handle 96 which then may be rotatated about its pivot axis 101 for simultaneously actuating collective pitch and throttle control. Upon releasing the trigger 125 the dog 122 is restored into locking engagement with rack 120 to retain the handle in its newly adjusted position.

This just described positive locking mechanism, if desired, may be modified to function simply as a frictional constraint for yieldingly holding the handle 96 against rotation relative to stick 24. In this case, if desired, the trigger 125 may be dispensed with, and the rack teeth 121 may be properly contoured and arranged so that the dog 122 will be dislodged therefrom whenever sufficient manual force is applied to handle 96 to override its frictional constraint.

As shown in FIGS. 1 and 2 the handle 95 as well as the independent throttle control knobs 98 and 98' are provided with frictional retaining devices, indicated generally at 131, for normally yieldingly holding each of the aforesaid control elements against angular motion. Since each of these detent element is the same as the other, generally only one will be described in the following paragraph.

In this arrangement, a housing structure 130 is suitably fixed and carried on the upper end of stick 24. An upstanding bracket 133 is fixed, such as by bolts 132, to the housing 130 in spaced parallel relation to handle 95. Suitable spacing is provided between the latter and bracket 133 so as to permit convenient grasp of the handle 95 without interference with the bracket 133. The latter is formed with an integral offset block or lug 135 having a bore 136 therethrough (see FIG. 2) whose axis intersects the axis of handle 95. A suitable plunger 138 slidably operates in bore 136 and it is spring pressed by coiled spring 141 with its nose portion in frictional engagement with the notched or serrated segment of handle 95. The tension of spring 141 may be increased or decreased, as desired, by threaded plug 140.

Also, it should be noted, that the radially projecting pins 128 serve as stop elements when they abut the opposite edges of lug 135 so as to limit the angular motion of the handle 95 and throttle knobs 98 and 98' within a desired range.

In FIG. 1 duplicate control organs are shown mechanically interconnected for dual control purposes. These two control organs are similar except that the cyclic control output arms 20 and 21 have been eliminated from the second stick since they are not needed.

As noted, the two frames 13 are solidly connected by tube or rod 14' for joint rotation about the X axis, while the two yoke members 16 are linked by rod 150 for joint rotation about the Y axis. Rod 151 links the two collective mechanisms and rod 152 serves to link the two throttle mechanisms for joint operation. Thus, it will be apparent that movement of any one or all of the control elements of one pilot station will cause a corresponding movement of the complementary elements of the other or second pilot station.

As mentioned earlier, the dual control system shown in FIG. 1 may be arranged, as desired, on a given helicopter either in side-by-side or tandem relationship, without requiring any substantial change of the basic control elements.

Thus, let it be assumed that the dual system of FIG. 1 is mounted on the helicopter in side-by-side relationship, in which case, the cyclic output control arm 21 will provide fore-and-aft or longitudinal control of the craft, while the cyclic output arm 20 will provide lateral or roll control. Now, let it be assumed that the system is rearranged in tandem, in which case, the arms 20 and 21 will of course have reverse sequence operation which will require reverse connections between said two arms and a given swashplate device to ensure that the flight direction of the helicopter will be in the same direction of stick 24 displacement.

For this change in layout of the control system, except for the proper orientation of the controls on the helicopter, the above-mentioned reverse-sequence connections is the only change required.

It is believed that this present control system fulfills the objects of the invention. Among other advantages, it will contribute largely to making the helicopter easier and less fatiguing to pilot. Further, it will enhance the safety of the craft by permitting instantaneous transition of the rotor to autorotational state in case of a sudden power failure in flight.

What is claimed is:

1. Flight control for a helicopter with variable-pitch rotor blades, a power drive, and a throttle for controlling said power drive, which comprises first and second universal joints, each having companion members turnable about axes normal to and intersecting each other with a common center at said intersection, fixed bearings for pivotal support of one of said companion members of each joint about its axis, a tubular stick mounted with one end on the other companion member of said first joint for universal motion therewith, a shaft mounted in said stick for universal motion with said stick and for independent rotation therein, with said stick and shaft constituting operating elements, a handle carried by one of said operating elements for movement with said stick and being also independently movable thereon, an operative connection between said handle and shaft element for turning said shaft on independent movement of said handle, two first arms carried by said companion members, respectively, of said first joint for pivotal motion therewith, a second arm carried by said one companion member of said second joint for pivotal motion therewith, operating connections between said first arms and blades for cyclic control, and a first operating connection from said second arm to said blades, and a second operating connection from said second arm to said throttle for simultaneously controlling the collective pitch of said blades and said throttle.

2. Flight control for a helicopter as in claim 1, which further provides a third universal joint having companion members, a second shaft mounted in said stick for rotation about the rotary axis of said first shaft and against axial motion therein, with one of said companion members of said third joint being carried by said second shaft for universal motion of said second shaft about said common center, a second handle carried by said second shaft for rotation therewith, a third arm on and turnable with the other one of said companion members of said third joint, and a third operating connection between said third arm and said second operating connection for operating said throttle independently of said first operating connection.

3. Flight control for a helicopter as in claim 1, in which said handle is carried by said stick.

4. Flight control for a helicopter as in claim 1, in which said handle is carried by said shaft.

* * * * *